US009928553B1

United States Patent
Harvey et al.

(10) Patent No.: US 9,928,553 B1
(45) Date of Patent: Mar. 27, 2018

(54) METHOD AND SYSTEM FOR GENERATING REAL-TIME IMAGES OF CUSTOMER HOMES DURING A CATASTROPHE

(71) Applicant: STATE FARM MUTUAL AUTOMOBILE INSURANCE COMPANY, Bloomington, IL (US)

(72) Inventors: Brian N. Harvey, Bloomington, IL (US); Nathan L. Tofte, Downs, IL (US); Roger D. Schmidgall, Normal, IL (US); Michael Jeffrey Aviles, Bloomington, IL (US); Kyle Pott, Bloomington, IL (US); Rosemarie Geier Grant, Ellsworth, IL (US); Eric Haefli, Bloomington, IL (US); Michael Shawn Jacob, Le Roy, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 201 days.

(21) Appl. No.: 14/510,536

(22) Filed: Oct. 9, 2014

(51) Int. Cl.
*G06Q 40/08* (2012.01)
*G06K 9/00* (2006.01)

(52) U.S. Cl.
CPC ......... *G06Q 40/08* (2013.01); *G06K 9/00637* (2013.01)

(58) Field of Classification Search
CPC .................................................. G06Q 40/08
See application file for complete search history.

(56) References Cited

U.S. PATENT DOCUMENTS

| 8,346,578 B1 * | 1/2013 | Hopkins, III | G06Q 40/00 382/100 |
| 8,380,545 B2 * | 2/2013 | Chen | G06Q 20/10 705/39 |
| 8,756,085 B1 | 6/2014 | Plummer et al. | |
| 8,818,572 B1 | 8/2014 | Tofte et al. | |

(Continued)

OTHER PUBLICATIONS

U.S. Appl. No. 14/510,307 entitled "Method and System for Determining the Condition of Insured Properties in a Neighborhood," filed Oct. 9, 2014.

(Continued)

*Primary Examiner* — Bruce I Ebersman
*Assistant Examiner* — David P Sharvin
(74) *Attorney, Agent, or Firm* — Marshall, Gerstein & Borun LLP; Randall G. Rueth

(57) ABSTRACT

A method and system may display real-time aerial images of insured properties in a neighborhood captured from an unmanned aerial vehicle (UAV), a manned aerial vehicle (MAV), or from a satellite device. For example, a neighborhood which has been affected by a catastrophe and has a large concentration of properties which are insured by a particular insurance provider may be identified. Aerial images of the entire neighborhood may then be received from the UAV, MAV, or the satellite device. As a result, the property owner may receive a notification that a catastrophe has impacted her neighborhood. The notification may also indicate that real-time images of the owner's property may be viewable by logging in to a customer account. Moreover, the real-time images may be transmitted via a web page to the property owner's web-enabled device after the property owner logs in to the customer account.

18 Claims, 5 Drawing Sheets

(56) References Cited

U.S. PATENT DOCUMENTS

| | | | |
|---|---|---|---|
| 8,872,818 | B2 | 10/2014 | Freeman et al. |
| 8,874,454 | B2 | 10/2014 | Plummer et al. |
| 2007/0070185 | A1* | 3/2007 | Dy .................... H04N 7/181 348/14.03 |
| 2007/0260401 | A1* | 11/2007 | Sydor .................. G06Q 40/08 702/1 |
| 2009/0265193 | A1* | 10/2009 | Collins ............. G06Q 30/0185 705/4 |
| 2012/0033851 | A1 | 2/2012 | Chen et al. |
| 2014/0019166 | A1 | 1/2014 | Swanson et al. |
| 2014/0100889 | A1 | 4/2014 | Tofte |
| 2014/0259549 | A1 | 9/2014 | Freeman et al. |
| 2014/0270492 | A1 | 9/2014 | Christopulos et al. |
| 2014/0278573 | A1 | 9/2014 | Cook |
| 2014/0278587 | A1 | 9/2014 | Plummer et al. |
| 2014/0320651 | A1 | 10/2014 | McClatchie et al. |
| 2014/0324483 | A1 | 10/2014 | Plummer et al. |
| 2014/0334689 | A1 | 11/2014 | Butler et al. |

OTHER PUBLICATIONS

U.S. Appl. No. 14/510,492 entitled "Method and System for Assessing Damage to Insured Properties in a Neighborhood," filed Oct. 9, 2014.

U.S. Appl. No. 14/510,784 entitled "Method and System for Assessing Damage to Infrastructure," filed Oct. 9, 2014.

Samadzadegan et al., "Earthquake destruction assessment of urban road network using satellite imagery and fuzzy interference systems," Proc. The International Archives of the Photogrammetry, Remote Sensing and Spatial Information Sciences, 2008, pp. 409-414.

Atkins et al., "An Integrated damage, visual, and radar analysis of the 2013 Moore Oklahoma EF5 tornado," American Meteorological Society, Jul. 2014.

Li et al., "Study on road damage assessment based on RS and GIS," IGARSS 2010.

Yamazaki, "Applications of remote sensing and GIS for damage assessment," In: ICUS/INCEDE Report 1, Joint Workshop on Urban Safety Engineering, Bangkok, 2001.

Office Action issued in U.S. Appl. No. 14/510,784 dated Nov. 25, 2014.

Office Action issued in U.S. Appl. No. 14/510,307 dated Dec. 18, 2014.

Office Action issued in U.S. Appl. No. 14/510,492 dated Jan. 8, 2015.

Office Action issued in U.S. Appl. No. 14/510,307 dated Jun. 24, 2015.

Office Action issued in U.S. Appl. No. 14/510,492 dated Jul. 15, 2015.

Office Action issued in U.S. Appl. No. 14/510,307 dated Nov. 19, 2015.

Office Action issued in U.S. Appl. No. 14/808,502 dated Nov. 27, 2015.

Gong et al. "Road damage detection from high-resolution RS image," IGARSS 2012.

Wang et al., "An object oriented method for road damage detection from high resolution remote sensing images," 19th International Conference on Geoinformatics, 2011.

Liu et al., "Object-oriented remote sensing image classification and road damage adaptive extraction," RSETE 2013.

Office Action issued in U.S. Appl. No. 14/510,492 dated Jul. 12, 2016.

Office Action issued in U.S. Appl. No. 14/510,307 dated May 20, 2016.

U.S. Appl. No. 15/165,457, filed May 26, 2016.

* cited by examiner

METHOD AND SYSTEM FOR GENERATING REAL-TIME IMAGES OF CUSTOMER HOMES DURING A CATASTROPHE

RELATED APPLICATIONS

This application is related to the following applications: co-pending U.S. patent application Ser. No. 14/510,307 entitled "METHOD AND SYSTEM FOR DETERMINING THE CONDITION OF INSURED PROPERTIES IN A NEIGHBORHOOD" and filed concurrently herewith; co-pending U.S. patent application Ser. No. 14/510,492 entitled "METHOD AND SYSTEM FOR ASSESSING DAMAGE TO INSURED PROPERTIES IN A NEIGHBORHOOD" and filed concurrently herewith; and co-pending U.S. patent application Ser. No. 14/510,784 entitled "METHOD AND SYSTEM FOR ASSESSING DAMAGE TO INFRASTRUCTURE" and filed concurrently herewith, the entire disclosures of which are hereby expressly incorporated by reference.

TECHNICAL FIELD

The present disclosure generally relates to a method and system for generating real-time aerial images of insured properties in a neighborhood during a catastrophe and, more particularly to sending real-time aerial images of a customer's home to a web-enabled device which is accessible via a customer account.

BACKGROUND

During and/or after a catastrophe, property owners may worry about the safety of their families as well as the condition of their homes and/or other properties. In situations where the property owner is out of town or away from his home for another reason, he may not know about the condition of his property for several days. Moreover, if the neighborhood is evacuated in anticipation of the catastrophe, the property owner may have no one to give him a report on the condition of his property.

Even if the property owner receives a report from a neighbor, it may be difficult for the neighbor to describe the extent of the damage and the amount of repairs necessary to restore the property.

SUMMARY

To display real-time (or at least near real-time) aerial images of insured properties during a catastrophe, a property display system may identify a neighborhood affected by a catastrophe and containing a large concentration of properties that are insured by the same insurance provider. For example, more than 20 percent of the properties in the neighborhood may be insured by the same insurance provider. Then an automatic inspection of the entire neighborhood may be performed by capturing real-time aerial images of the properties in the neighborhood. The automatic inspection may be performed by an unmanned aerial vehicle (UAV), or by a swarm of UAVs working together, which may be controlled by an insurance agent or by the system and flown all over the neighborhood to capture the images. Alternatively, the automatic inspection may be performed by a satellite which also captures real-time aerial images of the properties within the neighborhood. Moreover, the inspection may also be performed by a manned aerial vehicle (MAV) which captures aerial images of the properties while flying over the neighborhood. Each captured aerial image may be associated with a location, for example a GPS location, and the GPS location may be used to determine the owner of the property which is displayed in the captured aerial image.

The real-time aerial images for a particular insured property may then be transmitted to the property owner or to a user who is approved by the property owner, in the form of a web page. For example, the property owner may have a customer account with the insurance provider that is accessible using login information (e.g., a username and password). The property owner may designate authorized users, such as relatives of the property owner who can also view the particular insured property through using their own login information. In some embodiments, when the property is public property such as a public road or public school, all residents of the city may be designated as authorized users. A notification may be transmitted to the property owner and/or to the authorized users, using the property owner's and/or the authorized users' contact information (e.g., via email, a short message service (SMS) text message, an alert, a voice recording, etc.), to indicate to the property owner and/or to the authorized users that a catastrophe has occurred in the property owner's neighborhood and that real-time aerial images of the property have been generated and are accessible through the customer accounts. When the property owner and/or the authorized users log in to their customer accounts via a web-enabled device such a computer, laptop, mobile phone, etc., a display of the real-time aerial images of the property may be provided. The display may include several images at different angles, and locations within the neighborhood. In this manner, the property owner receives a complete view of the condition of her property during a catastrophe, even when she is away from her home. Moreover, relatives or close friends of the property owner may also receive a complete view of the property, which may allow them to come to the aid of the property owner more quickly.

Additionally, during the catastrophe the automatic inspection may be performed several times at predetermined time intervals to provide property owners with constant updates of the statuses of their properties. For example, the UAV(s), MAV, or satellite may repeatedly survey the neighborhood every 30 minutes by capturing the same photographs and/or video of the neighborhood as captured previously. The updated images may then be transmitted to the property owner's web-enabled device, thereby providing owners with up-to-the-minute updates on the statuses of their properties.

In an embodiment, a method for displaying near real-time aerial images of insured properties during a catastrophe is provided. The method includes identifying a neighborhood including a concentration of insured properties which is above a predetermined threshold concentration level, wherein the neighborhood has been affected by a natural or a man-made disaster. The method further includes receiving a plurality of near real-time aerial images, wherein the plurality of near real-time aerial images display the neighborhood including the insured properties. For each of the insured properties in the identified neighborhood, the method includes determining one or more near real-time aerial images of the plurality of near real-time aerial images which display at least a portion of an insured property of the insured properties, identifying an owner of the insured property based on a location of the insured property, and identifying contact information for the owner of the insured property. For each of the insured properties, the method further includes transmitting a notification to a web-enabled device of the owner, using the owner contact information that a property display web page including the one or more near real-time aerial images which display the at least a portion of the insured property has been generated. Moreover, upon receiving a customer identifier corresponding to the owner of the insured property, the method includes transmitting the property display web page to the web-enabled device.

In another embodiment, a system for displaying near real-time aerial images of insured properties during a catastrophe is provided. The system includes a communication network, and one or more computing devices communicatively coupled to the communication network, each of the one or more computing devices having a memory and one or more processors. At least one of the computing devices is configured to identify a neighborhood including a concentration of insured properties which is above a predetermined threshold concentration level, wherein the neighborhood has been affected by a natural or a man-made disaster. At least one of computing devices is further configured to receive a plurality of near real-time aerial images via the communication network, wherein the plurality of near real-time aerial images display the neighborhood including the insured properties. For each of the insured properties in the identified neighborhood, at least one of the computing devices is configured to determine one or more near real-time aerial images of the plurality of near real-time aerial images which display at least a portion of an insured property of the insured properties, identify an owner of the insured property based on a location of the insured property and identify contact information for the owner of the insured property. For each of the insured properties, at least one computing device is further configured to transmit a notification to a web-enabled device of the owner, using the owner contact information, that a property display web page including the one or more near real-time aerial images which display the at least a portion of the insured property has been generated. Moreover, upon receiving a customer identifier corresponding to the owner of the insured property, at least one computing device is configured to transmit the property display web page to the web-enabled device.

BRIEF DESCRIPTION OF THE DRAWINGS

The figures described below depict various aspects of the system and methods disclosed therein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
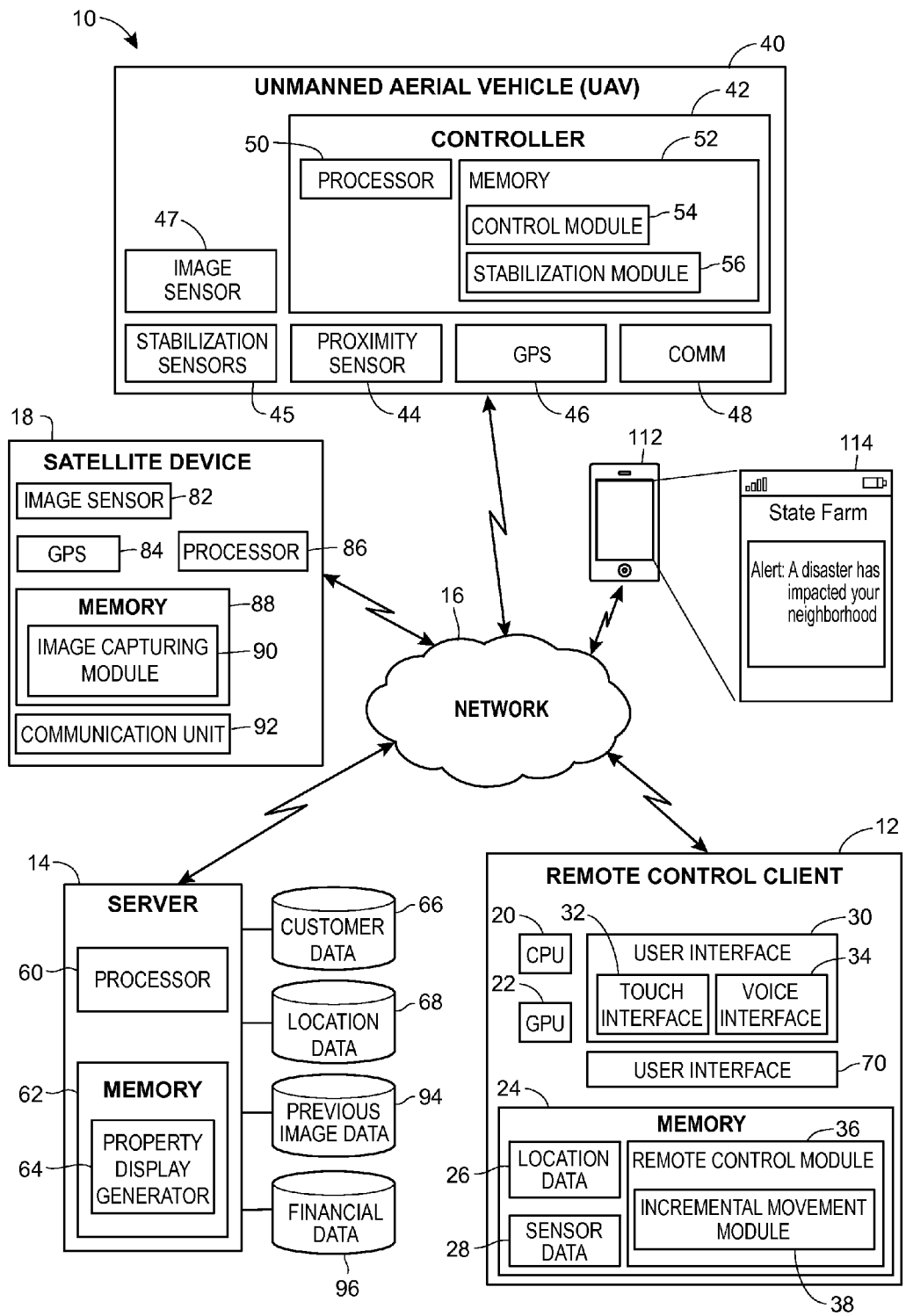
FIG. 1 illustrates a block diagram of an example system in which techniques for providing real-time aerial images of insured properties in a neighborhood are implemented.

Although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Accordingly, the term "aerial image" as used herein, may be used to refer to any image data within the electromagnetic spectrum (i.e. including the visible light spectrum as well as the invisible light spectrum), which is captured from an elevated position. Aerial images may include visible light imaging, radar imaging, near infrared imaging, thermal infrared imaging, hyperspectral imaging, multispectral imaging, full spectral imaging, etc. For example, an image captured by a satellite, a manned aerial vehicle (MAV), or an unmanned aerial vehicle (UAV) may be referred to herein as an "aerial image." An aerial image may be made up of data points, for example pixel data points, where each data point may correspond to a specific global positioning system (GPS) location. An aerial image may also include video captured from an elevated position.

Also, the terms "catastrophe," and "disaster" are used interchangeably herein to refer to any natural or man-made disaster. A natural disaster may include: a tornado, a hurricane, an avalanche, an earthquake, a flood, a tsunami, a volcanic eruption, a hail storm, a wildfire, a thunderstorm, etc. A man-made disaster may include: a nuclear incident, a war, an act of terrorism, a natural gas explosion, a train derailment, a chemical spill (e.g., from a train or a truck), an explosion, etc.

The term "insurance provider" as used herein, generally refers to a party or entity (e.g., a business or other organizational entity) that provides insurance products, e.g., by offering and issuing insurance policies. Typically, but not necessarily an insurance provider may be an insurance company. Further, an insurance provider can be any individual, group of individuals, company, corporation, or other type of entity that can issue insurance policies for customers, such as insurance policies associated with properties.

An insurance provider may offer or provide one or more different types of insurance policies. Types of insurance policies may include, for example, homeowner's insurance; condominium owner's insurance; renter's insurance; business insurance (e.g., property, liability, inland marine and mobile property, etc.); insurance for catastrophic events such as flood, fire, volcano damage, etc.; personal liability insurance; and other types of insurance products. In embodiments as described herein, the insurance providers initiate and/or process claims related to insurance policies that cover one or more real estate properties (e.g., homes, condominiums, apartments, mobile homes, house boats, vacation homes, recreational vehicles (RVs), boats, office buildings, businesses, etc.).

The terms "property owner," "owner," and "customer" are used interchangeably herein to refer to a person, party, or entity (e.g., a business or other organizational entity) that has at least a partial ownership in a property which is insured by the insurance provider. While the term "customer" may be used interchangeably with the term "property owner," in this specification the term "property owner" is used primarily so as to avoid confusion. Generally, the term "user" is used when referring to a person who is operating a web-enabled device and is not exclusive of the terms "property owner," "owner," or "customer." For example, a property owner may be referred to as a user, when the property owner views a web page generated by the insurance provider on a web-enabled device.

The term "real-time" as used herein, may be used to refer to information delivered within a predetermined amount of time after it is collected (e.g., minutes, hours, days, etc.). For example, an aerial image captured by a satellite, a manned aerial vehicle (MAV), or an unmanned aerial vehicle (UAV) and transmitted to a client or server device within a short period of time after it is captured may be referred to herein as a "real-time aerial image."

Generally speaking, to display real-time (or at least near real-time) aerial images of insured properties during a catastrophe, an aerial image capturing device which may be a satellite, MAV or one or several UAV(s) is/are directed to capture images within an identified neighborhood affected by a catastrophe and having a large percentage of properties which are insured by an insurance provider. In some embodiments, the aerial image capturing device may also capture images for a neighborhood after a theft or other property damage. The aerial image capturing device may be directed by a remote control client device having user controls for determining the location and the amount of photographs or video captured. The captured aerial images may then be provided to the remote control client device or to a server computer and grouped based on their GPS locations to determine a group of aerial images which correspond to an insured property. Each group of aerial images corresponding to an insured property may be aggregated, for example using photogrammetry, stereoscopy, or LIDAR, to create a 3-dimensional (3D) image of the insured property.

The 2D or 3D image may be created at a predefined level of detail (e.g., accurate to within ten percent) and/or may be adjustable (e.g., a user or the system may be able to "zoom in" or "zoom out" of the image). Moreover, the 2D or 3D image may be divided into property components, such as a roof, a door, siding, an exterior wall, a front lawn, a backyard, an outdoor swimming pool, a fence, a tree, a deck, a patio, etc.

The server computer may then transmit a notification to the owner of the insured property, using the owner's contact information, alerting the owner that a catastrophe, theft or other damage has occurred in her neighborhood and that images of her property have been generated and are available for viewing. The notification may be an electronic notification such as an email, SMS text message or alert, and may also include a prompt or link to a login page for accessing the images. In some embodiments, authorized users may also receive the notification. When the owner or another authorized user successfully logs in to the system, the server computer may transmit a property display web page which includes real-time (or at least near real-time) aerial images of the owner's property. The web page may include several images taken from different locations, angles and/or zoom levels and may include user controls which enable the owner or authorized user to toggle between each of the real-time aerial images of her property. Additionally, as the owner or authorized user views the real-time aerial images, the aerial image capturing device may capture new aerial images taken from the same locations, angles and zoom levels after a predetermined time interval. The new aerial images may also be transmitted to the owner or authorized user, and when the owner or authorized user refreshes the page or toggles to another image, the most recent aerial images may be displayed. In this manner, the owner or authorized user may be provided with up-to-the-minute updates on the status of the property.

For example, the Smith family may be away from their home in Florida when a hurricane strikes their neighborhood. Due to the severity of the storm, many of the Smiths' neighbors may be left without cell phone service and the Smiths may have no way of reaching their neighbors to find out about the condition of their home. However, the Smith family may be notified of the hurricane by the property display system via email, or an alert on their cell phones. One of the Smiths may then sign on to his customer account through his insurance provider and view web pages or application screens which display the status of the Smiths' home. The Smiths may also see periodic updates to the images which may calm their fears or at least allow them to avoid unexpected surprises. Moreover, viewing images of their home may allow the Smiths to make hotel or other temporary arrangements before they comes home. The images may also allow the Smith family to call repairmen and begin fixing the damage done to their house as soon as possible.

In an alternative embodiment, the aerial image capturing device may also capture aerial images for surveillance. For example, after receiving permission from a property owner, the aerial image capturing device may capture aerial images of a car or boat dealership, a department store, a restaurant, a shopping mall, a warehouse, an office building, etc. The aerial image capturing device may hover over the property and capture aerial images at predetermined time intervals (e.g. every minute, every second, etc.). Moreover, a notification may be transmitted to the owner when suspicious activity has occurred prompting the owner to log in to the system. When the owner successfully logs in, the server computer may transmit a property display web page which includes real-time (or at least near real-time) aerial images of the dealership, department store, restaurant, office building, etc. In this manner, additional surveillance may be provided from the exterior of a building. Moreover in some embodiments, the captured aerial images may be transmitted to a security company which may analyze the aerial images in addition to images from their own security cameras.

FIG. 1 illustrates various aspects of an exemplary environment implementing a property display system 10 (also referred to herein as "the system"). The system 10 may include a remote control client 12 coupled to one or several unmanned aerial vehicles (UAVs) 40, an MAV, a satellite device 18, a web-enabled device 112 and a server 14 via a communication network 16. The remote control client 12 may be, for example, a laptop computer, a tablet computer, a smartphone, a wearable device, etc. In the embodiment illustrated in FIG. 1, the remote control client 12 may include a central processing unit (CPU) 20, a graphics processing unit (GPU) 22, a computer-readable memory 24, and a user interface 30 for controlling the UAV(s) 40 or the satellite device 18. The user interface 30 may include a touch interface 32, voice interface 34, etc. In various implementations, the touch interface 32 can include a touchpad over which the user moves his fingers while looking at a separately provided screen, a touchscreen where the user places his fingers directly over the image being manipulated or over a displayed control being activated (e.g. a displayed keyboard), etc. In other implementations, the voice interface 34 may include any device that includes a microphone, such as a Bluetooth ear piece, a smartphone, etc.

The memory 24 is a computer-readable non-transitory storage device that may include both persistent (e.g., a hard disk) and non-persistent (e.g., RAM) memory components, stores instructions executable on the CPU 20 and/or the GPU 22 that make up a remote control module 36 and location data 26 and sensor data 28 on which the remote control module 36 operates. The remote control module 36 includes an incremental movement module 38 that allows a user to easily control the UAV(s) 40 via step-like, incremental movements in which one incremental movement is in response to one single user command.

The remote control module 36 according to various implementations operates as a separately executable software application, plugin that extends the functionality of another software application such as a web browser, application programming interfaces (API) invokable by a software application, etc. The instructions that make up the remote control module 36 may be compiled and executable on the CPU 20 and/or the GPU 22 directly, or not compiled and interpreted by the CPU 20 at runtime.

Referring still to FIG. 1, each UAV 40 includes a controller 42 that communicates with one or more proximity sensors 44, one or more stabilization sensors 45, a Global Positioning System (GPS) unit 46, image sensors 47, and a communications unit 48. The image sensors 47 may include one or more filters for infrared imaging, hyperspectral imaging, multispectral imaging, full spectral imaging, etc., or alternatively, the image sensors 47 may include one or more sensors which receive image data outside of the visible light spectrum such as an infrared image sensor. The controller 42 includes a processor 50 that executes instructions from a computer-readable memory 52 to implement a control module 54 and a stabilization module 56. The control module 54 may invoke the stabilization module 56 to retrieve data from the stabilization sensors 45 (i.e., sensors relating to avionics) to implement a control function, such as that associated with a control routine that performs PID (proportional-integral-derivative), fuzzy logic, nonlinear, etc., control to maintain the stability of the UAV(s) 40. For instance, the stabilization sensors 45 may include one or more of a directional speed sensor, a rotational speed sensors, a tilt angle sensor, an inertial sensor, an accelerometer sensor, or any other suitable sensor for assisting in stabilization of an aerial craft. Of course, the stabilization module 56 may implement any suitable technique of stabilizing the remote aerial device 40 in a hover or stationary three dimensional position.

The control module 54 may retrieve data from the proximity sensors 44. These proximity sensors 44 may include any sensor or technique that assists the control module 44 in determining a distance and a direction to the insured properties within the neighborhood. The one or more proximity sensors 44 may include optic flow sensors, ultrasonic sensors, infrared sensors, LIDAR (Light Detection and Ranging), a stereo vision system (SVS) that may utilize the image sensors 47 (e.g., one or more cameras) to implement stereoscopic imaging techniques to capture aerial images of the neighborhood including the insured properties and to create 3D images of the insured properties. The control module 54 may also receive instructions from the client device 12 to capture aerial images at specific locations or time intervals.

The GPS unit 46 may use "Assisted GPS" (A-GPS), satellite GPS, or any other suitable global positioning protocol or system that locates the position of the UAV(s) 40. Moreover, the GPS unit 46 may also determine the position of the aerial images or of data points within the aerial images captured by the UAV(s) 40, or the GPS may be combined with the distance and direction sensors 44 to determine the position of the aerial images, and positions of data points within an aerial image. For example, A-GPS utilizes terrestrial cell phone towers or wi-fi hotspots (e.g., wireless router points) to more accurately and more quickly determine the location of the device while satellite GPS generally are more useful in more remote regions that lack cell towers or wi-fi hotspots. The communication unit 48 may communicate with the server 14 or the client device 12 via any suitable wireless communication protocol network, such as a wireless telephony network (e.g., GSM, CDMA, LTE, etc.), a wi-fi network (802.11 standards), a WiMAX network, a Bluetooth network, etc.

As mentioned above, the system 10 may also include a satellite device 18 which includes an image sensor 82 for capturing aerial images and a GPS unit 84 for determining the position of each image. For example, the satellite device 18 may determine GPS coordinates of the boundaries of an aerial image, and also may determine GPS coordinates of data points, such as pixel data points, of the aerial image. The satellite device 18 may also include a processor 86 which executes instructions from a computer-readable memory 88 to implement an image capturing module 90, which may capture and transmit satellite images at the request of the client device 12. For example, the client device 12 may request satellite images between specified GPS coordinates, and the image capturing module 90 may transmit satellite images within the specified coordinates. Moreover, in some embodiments the client device 12 may specify the number of satellite images for the image capturing module 90 to capture and the zoom level. The client device 12 or the server 14 and the satellite device 18 may communicate via a communication unit 92 via any suitable wireless communication protocol network, such as a wireless telephony network (e.g., GSM, CDMA, LTE, etc.), a wi-fi network (802.11 standards), a WiMAX network, a Bluetooth network, etc.

The web-enabled device 112 may be a personal computer, laptop computer, cellular phone, mobile smart phone, tablet, web-enabled television, wearable computing device, etc., and may be communicatively connected to the MAV, the UAV(s) 40, the satellite 18, the remote control client 12 and the server computer through the communication network 16. The web-enabled device 112 may interact with the server 14 to receive web pages, application views, notifications, alerts or server data from the server 14 and may display the web pages, application views, notifications, alerts or server data view a client application (described below). For example, the web-enabled device 112 may display a home screen 114 (i.e., the root or start at which users enter the client application) of the client application to a user, may receive an input from the user, and may interact with the server 14 depending on the type of user-specified input. The home screen 114 as shown in FIG. 1, may include a notification to the user that there has been a disaster in her area, and to login to the system for more details. The home screen 114 may also include a button which takes the user to a login page for entering identification information. However, FIG. 1 merely illustrates a condensed version of the web-enabled device 112, and a more detailed version of the web-enabled device 112 is described below with reference to FIG. 2.

The server 14 may include customer data (e.g., a customer account including customer biographical information, customer identification information such as a username and password, type of property, customer contact information, etc.), location data (e.g., a property location of a customer, etc.), previous image data (e.g., aerial images of insured properties taken at an earlier date), and financial data (e.g., cost estimates of property and materials similar to those that were damaged or destroyed, labor costs for repairing/replacing the property, etc.) from a customer database 66, a location database 68, a previous image database 94, and a financial database 96, respectively. The server 14 then may provide the customer data, the location data, the previous image data, the financial data and appropriate indications of how certain portions of the customer data and the location data are linked, to the remote control client 12 as part of the location data 26. The remote control client 12 may use this location data to determine a geographic location that the UAV(s) 40 is/are initially sent to and may use the previous image data to determine a condition of an insured property as compared to its previous condition. The financial data may be used for performing cost estimates/claim assessments for repairing damaged properties (or at least for performing cost estimates/claim assessments for repairing the exterior of the damaged properties). The customer database 66, the location database 68, the previous image database 94 and the financial database 96 may be disposed within the remote control client 12 depending on the implementation.

The server 14 may also include a processor 60 which executes instructions from a computer-readable memory 62 to implement a property display generator 64. The property display generator 64 may populate and transmit client application data and web pages to the web-enabled device 112 and also receive information from the user transmitted back to the server 14. For example, the property display generator 64 may receive real-time aerial images which display a particular insured property in the neighborhood. Based on the GPS location of an image, the property display generator 64 may determine the owner of the particular insured property using the location data. The property display generator 64 may then generate web pages or client application screens which display the real-time aerial images of the particular insured property, and may transmit the web pages or client application screens upon receiving the proper identification information from the owner.

It will be appreciated that although only one server 14 and one web-enabled device 112 is depicted in FIG. 1, multiple servers 14 may be provided for the purpose of distributing server load, serving different web pages, etc. Moreover, multiple web-enabled devices 112 may also be provided. For example, a user may receive the notification on one web-enabled device 112. Further, the user may enter login information and view real-time aerial images of the user's property on another web-enabled device 112.

Figure 2:
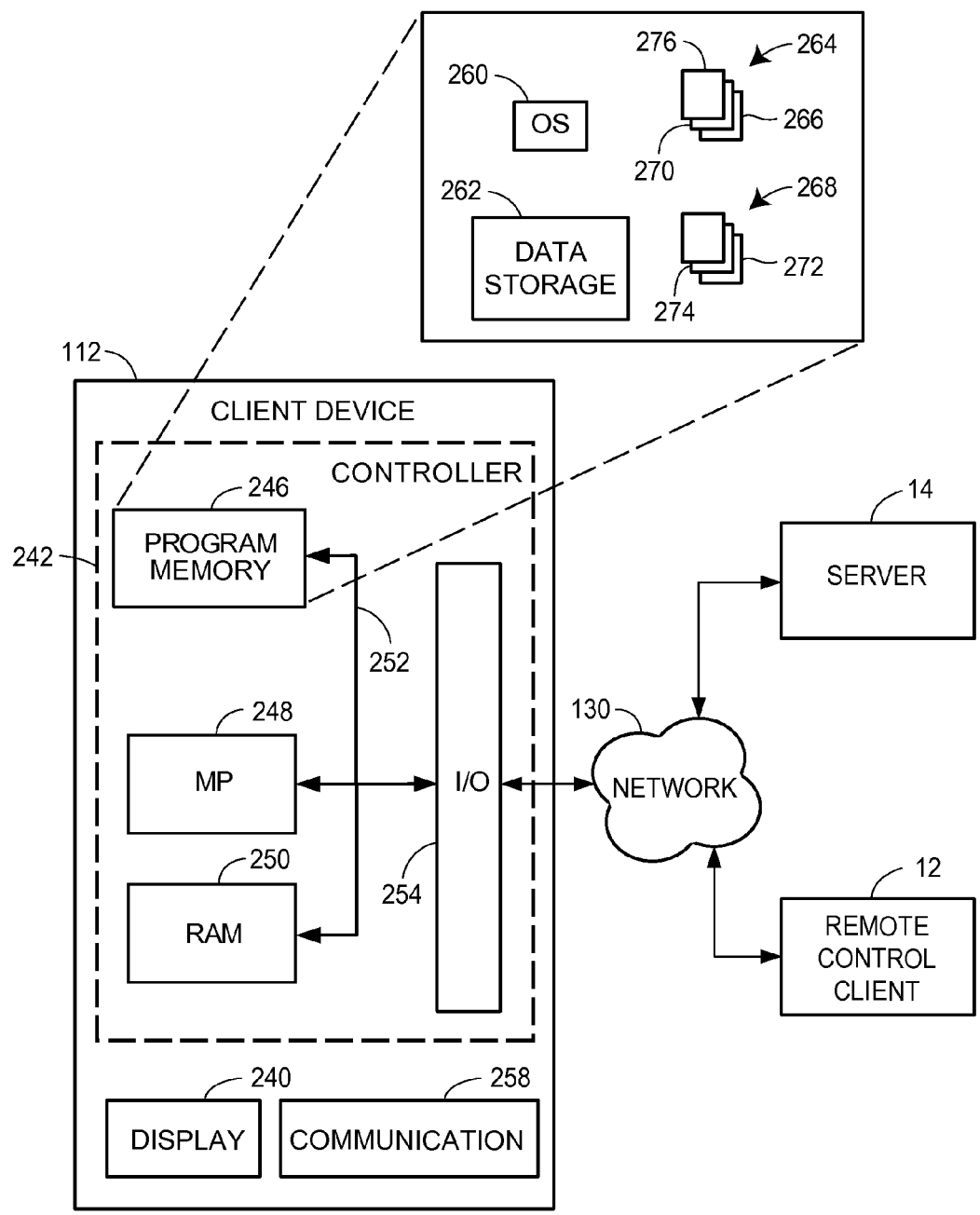
FIG. 2 illustrates a block diagram of an exemplary mobile device.

FIG. 2 illustrates the web-enabled device 112 of FIG. 1 in further detail. The web-enabled device 112 includes a display 240, a communication unit 258, a user-input device (not shown), and, a controller 242. The controller 242 includes a program memory 246, one or more microcontroller or a microprocessor (MP) 248, a random-access memory (RAM) 250, and an input/output (I/O) circuit 254, all of which are interconnected via an address/data bus 252. The program memory 246 includes an operating system 260, a data storage 262, a plurality of software applications 264, and a plurality of software routines 268. The operating system 260, for example, may include one of a plurality of mobile platforms such as the iOS®, Android™ Palm® webOS, Windows Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM), and Nokia, respectively. The data storage 262 may include data such as user profiles, application data for the plurality of applications 264, routine data for the plurality of routines 268, and other data necessary to interact with the server 14 through the communication network 16 of FIG. 1. In some embodiments, the controller 242 may also include, or otherwise be communicatively connected to, other data storage mechanisms (e.g., one or more hard disk drives, optical storage drives, solid state storage devices, etc.) that reside within the web-enabled device 212.

The user-input device (not shown) may include a "soft" keyboard that is displayed on the display 240 of the web-enabled device 212, an external hardware keyboard communicating via a wired or a wireless connection (e.g., a Bluetooth keyboard), an external mouse, or any other suitable user-input device. It should be appreciated that although FIG. 2 depicts only one microprocessor 248, the controller 242 may include multiple microprocessors 248. Similarly, the memory of the controller 242 may include multiple RAMs 250 and multiple program memories 246. Although FIG. 2 depicts the I/O circuit 254 as a single block, the I/O circuit 254 may include a number of different types of I/O circuits. The controller 242 may implement the RAM(s) 250 and the program memories 246 as semiconductor memories, magnetically readable memories, and/or optically readable memories, for example.

The one or more processors 248 may be adapted and configured to execute any one or more of the plurality of software applications 264 and/or any one or more of the plurality of software routines 268 residing in the program memory 242, in addition to other software applications. One of the plurality of applications 264 may be a client application 266 that may be implemented as a series of machine-readable instructions for performing the various tasks associated with receiving information at, displaying information on, and transmitting information from the web-enabled device 212. One of the plurality of applications 264 may be a native application or web browser 270, such as Apple's Safari®, Google Android™ mobile web browser, Microsoft Internet Explorer® for Mobile, Opera Mobile™, that may be implemented as a series of machine-readable instructions for receiving, interpreting, and displaying web page information or application data from the server 14 while also receiving inputs from the user. Another application of the plurality of applications may include an embedded web browser 276 that may be implemented as a series of machine-readable instructions for receiving, interpreting, and displaying web page information from the server 14.

One of the plurality of routines may include a catastrophe notification routine 272 that coordinates with the server 14 to receive notifications of catastrophes in the user's neighborhood. Another routine in the plurality of routines may include a property display routine 274 that coordinates with the server 14 to receive real-time aerial images of the user's property, to toggle between several displays of the various real-time aerial images, and to receive updated images.

Figure 3A:
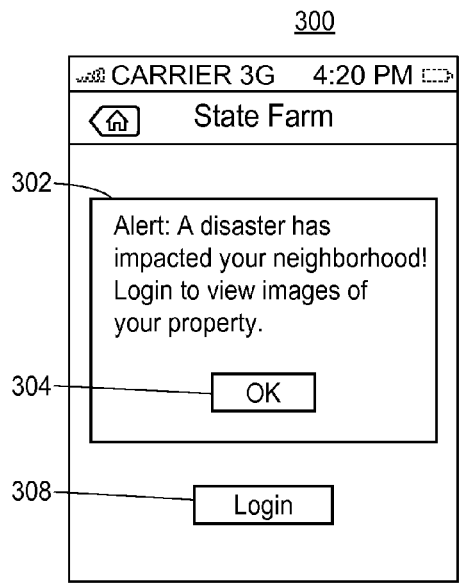
FIG. 3A depicts an exemplary notification screen of a client application in accordance with the presently described embodiments.
Figure 3B:
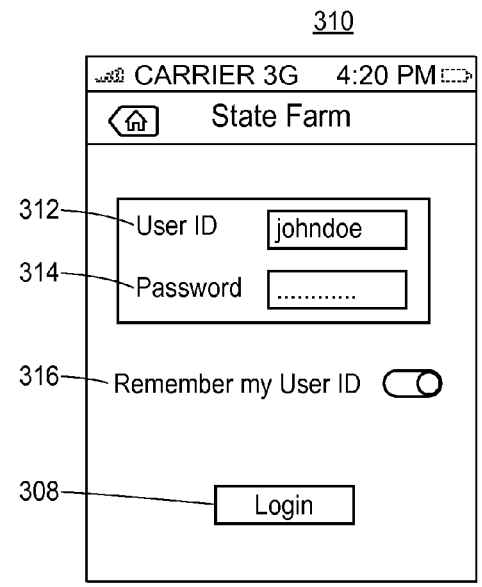
FIG. 3B depicts an exemplary login screen of a client application in accordance with the presently described embodiments.
Figure 3C:
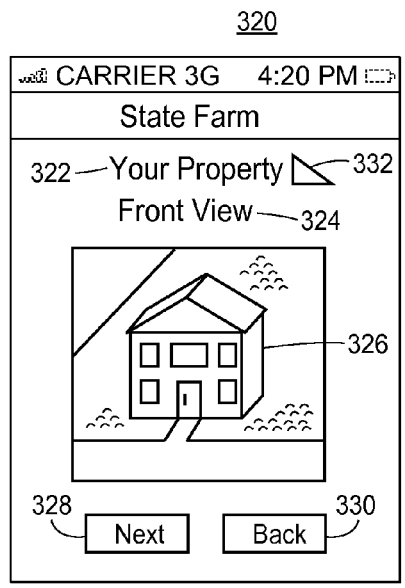
FIG. 3C depicts an exemplary property display screen of a client application in accordance with the presently described embodiments.

As shown in FIG. 2, to access the server 14, the user executes the client application 266 on the web-enabled device 122. Using the client application 266, the user may request server data (not shown) by navigating a series of client application screens, such as the home screen 114 of the client application 266. FIGS. 3A-3C depict client application pages or screens that the server 14 may transmit in various embodiments of the property display system 10. In any event, the user may launch the client application 266 from the web-enabled device 112 via any suitable manner, such as touch-selecting a client application icon (not shown) on the display 240 of the web-enabled device 112, double-clicking on the client application icon via a mouse of the web-enabled device 112 or a trackpad (not shown) of the web-enabled device 112. After the user launches the client application 266, the home screen 114 of the client application 266 is displayed to the user on the web-enabled device 112.

FIG. 3A depicts the home screen 300 of the client application 266, as displayed to the user on the web-enabled device 112. The home screen 300 may include a notification 302 alerting the user that a disaster has impacted her neighborhood or the neighborhood of a property owner who authorized the user to view the property. For example, the notification 302 may state, "Alert: A disaster has impacted your neighborhood! Login to view images of your property." The home screen 300 may also include an "OK" button 304 which when selected by the user, may direct the user to a login screen, such as the login screen 310 as described below in FIG. 3B. In some embodiments, the notification 302 may be embedded over the login screen 310, and when the "OK" button 304 is selected, the notification 302 may disappear. In such an embodiment, a "Login" button 308 may appear on the home screen 300, as depicted in FIG. 3A.

In order to receive the notification 302 at the client application 266 before the user enters login information, the data storage 262 of the web-enabled device 112 may store application data for the client application 266, as described above. For example, this data may include the location of the user's property, a username or any other suitable information from which to identify the user of the web-enabled device. While the login screen 310 may require an enhanced level of security, for example, requiring the user to enter both a username and a password, the notification 302 may be transmitted upon verifying the identity of the user based on the stored application data. For example, the server 14 may determine based on a comparison of the GPS location of the aerial images to location data in the location database 68, that an aerial image displays John Doe's home. The server 14 may then receive application data from a web-enabled device 112 which includes John Doe's username, and as a result, the server 14 may transmit the notification 302 to the web-enabled device. In other embodiments, the user remains logged in after initially logging in to the client application 266 and the notification 302 may be transmitted by verifying the user's login information.

Moreover, in some embodiments where the web-enabled device is a mobile smart phone, the notification 302 may appear on the lock screen of the mobile smart phone even before the user selects the client application 266. Additionally, the notification 302 may also appear again on the home screen 300 when the user selects the client application 266.

Further, in yet other embodiments, the notification 302 may be transmitted to the user via email, SMS message, an automated voice recording, etc. The server 14 may transmit the notification 302 by identifying contact information for the owner of the insured property. For example, contact information such as a phone number or email address may be stored in the customer database 66 as part of a customer account for the owner. The server 14 may then transmit the notification 302 to a device associated with the identified phone number, or to the identified email address. In some embodiments, the owner may enter the contact information into her customer account, or contact information may be obtained when the owner takes out an insurance policy with the insurance provider. In such instances, the notification 302 may appear again on the home screen 300 when the user selects the client application 266 or may not appear on the client application 266.

With reference now to FIG. 3B, a login screen 310 may include an area for logging in to a customer account by entering a username 312 and a password 314. The login screen 310 may also include an area for remembering the username 316 to avoid entering the same username the next time the user logs in to the system. Once the user enters a username and password, the user may select a "Login" button 308. After the "Login" button is selected, the server 14 may verify that the username and password correspond to a customer profile from the customer database 66 of FIG. 1. If the username and password do not correspond to a customer account, the login screen 310 may display an error message and prompt the user to reenter a username and password. If there is a successful match, the client application 266 may display a property display screen 320, such as that depicted in FIG. 3C.

The property display screen 320 may include the name of the property being displayed, i.e., "Your Home" 322, the name of the aerial image being displayed 324 or the viewpoint of the property, i.e., "Front View," and an aerial image which displays the property 326. The property display screen 320 may also include "Next" 328 and "Back" 330 buttons which when selected allow the user to toggle between each of the aerial images which display the property. For example, the user may be John Doe and the property may be John Doe's home. In another example, when the user is authorized by the property owner to view the property owner's home, the name of the property being displayed may be, "John Doe's Home" rather than "Your Home." In some embodiments, in addition to displaying homes, the property display screen may display a business or office building owned by the user. In any event, when John Doe selects the "Next" button 328, an aerial image which displays a rear view of his property may be displayed and the name of the aerial image 324 may be "Rear View." Moreover, when John selects the "Back" button 330, an aerial image which displays an overhead view of his property may be displayed and appropriately named "Overhead View." In some embodiments, the property display screen 320 may include aerial images of the exterior of a commercial building for surveillance.

When the UAV 40, the MAV, or the satellite device 18 captures a new aerial image of the same property and at the same viewpoint, the property display screen 320 may update the property display 326 with the new aerial image. For example, if the satellite device 18 takes a new front view image of John Doe's house, the display 326 of the "Front View" may be removed and replaced with the new aerial image.

If a user has multiple properties in a neighborhood affected by a catastrophe or in multiple neighborhoods each affected by a catastrophe, the user may toggle between the different properties. For example, the user may select the triangle button 332 to select another property than "Your Home" 322, such as "Your Business" (not shown). When the user selects a different property name 322, several aerial images which display the different property may appear on the property display 326 along with their respective names 324, such as a front view of John Doe's business, a rear view of John Doe's business, a side view of John Doe's business, etc. While FIG. 3C depicts aerial images of a house on the property display 326, the property display may include an apartment building, a condominium, a mobile home, a house boat, a vacation home, a boat, an RV, a hotel, commercial buildings such as an office building or business, a store or a restaurant or any other real estate property which may be insured by an insurance provider and may include residences or docks/storage.

In some embodiments, the property display 326 may further include indicators overlaying the property which indicate the extent of the damage to the property (also referred to interchangeably herein as "damage severity level indicators"). The property may be divided into property components such as a roof, a door, a window, siding, exterior walls, a lawn, a backyard, a driveway, a garage, an outdoor swimming pool, a fence, a tree, a deck, a patio, etc. A different damage severity level indicator may be assigned to each property component depending on the extent of the damage to the property component. For example, the damage severity level indicators may be a set of colors where each color represents a different damage severity level. The property display 326 of John Doe's home may include a red roof, a green front door, yellow windows and purple siding. The color indicators may further help the user understand the extent of the damage to her property.

To determine a damage severity level, the property display generator 64 or another module on the server 14 or the remote control client 12 may determine the condition of a property component. For example, the condition may be determined by comparing aerial images of the property to previous aerial images of the property before the catastrophe occurred or to images of a similar intact property as described in aforementioned, co-pending U.S. patent application Ser. No. 14/510,492 entitled "METHOD AND SYSTEM FOR ASSESSING DAMAGE TO INSURED PROPERTIES IN A NEIGHBORHOOD, and as described in co-pending U.S. patent application Ser. No. 14/510,784 entitled "METHOD AND SYSTEM FOR ASSESSING DAMAGE TO INFRASTRUCTURE." Previous aerial images of the property may be stored in the previous image database 94 as shown in FIG. 1. A damage severity level may be determined based on the condition of the property component and/or the aerial images also as described in aforementioned, co-pending U.S. patent application Ser. No. 14/510,492 entitled "METHOD AND SYSTEM FOR ASSESSING DAMAGE TO INSURED PROPERTIES IN A NEIGHBORHOOD," and as described in co-pending U.S. patent application Ser. No. 14/510,784 entitled "METHOD AND SYSTEM FOR ASSESSING DAMAGE TO INFRASTRUCTURE." Damage severity levels may be represented as a set of damage severity level categories such as "low damage," "moderate damage," "high damage," "total loss," "no loss," "very low damage," "very high damage," etc. Moreover, damage severity levels may be represented numerically based on the amount of loss to the property component, i.e., 20 percent loss, 50 percent loss, 100 percent loss, etc. An indicator may then be assigned to each damage severity level category or range of amount of loss. For example, with reference to John Doe's property display mentioned above, the red roof may correspond to "total loss" or between 80 and 100 percent loss. The green front door may correspond to "no loss" or less than 20 percent loss. Additionally, the yellow windows may correspond to "moderate damage" or between 40 and 70 percent loss and the purple siding may correspond to "low damage" or between 30 and 40 percent loss.

While the damage severity level indicators are described as the colors red, green, purple, and yellow, the indicators are not limited to those particular colors. Instead, the damage severity level indicators may include any color and also may include any other suitable representation of a damage severity level. For example, damage severity level indicators may include numbers which are placed over each property component, labels, symbols, different shading techniques, etc.

Turning back to FIG. 1, before the server 14 transmits a notification and/or display of real-time aerial images to a user, the property display generator 64 may identify a neighborhood that has been affected by a catastrophe, theft, or other damage. To identify a neighborhood affected by a catastrophe, theft, or other damage, the property display generator 64 and/or the server 14 may connect to a third-party server (not shown). The third-party server can include data from news sources (e.g., national news networks, regional news networks, newspapers, magazines, news websites, and others), data from weather sources (e.g., the National Oceanic and Atmospheric Administration; other federal, state, or local governmental weather bureaus; commercial weather services; weather websites; and others), data from governmental sources (e.g., the Department of the Interior, the Department of Homeland Security, other federal, state, and local governmental sources, and others), data from social networks (e.g., Facebook®, Twitter®, Google+ ®, Instagram®, and others), data from public databases, data from private databases (e.g., consultants, data miners, surveyors, and others), crowd sourced weather data (e.g., connected users or user devices may report extreme weather conditions to a central server) or other sources. The property display generator 64 may then use this data to determine whether or not a catastrophe has occurred and where it has occurred. Moreover, in some embodiments the remote control client 12 user such as an insurance agent, may input information related to a catastrophe into the remote control client 12 which may be transmitted to the property display generator 64 of the server 14 over the communication network 16. Neighborhoods affected by a catastrophe may include those neighborhoods impacted by a tornado, hurricane, avalanche, earthquake, flood, tsunami, volcanic eruption, hail storm, wildfire, thunderstorm, nuclear incident, war, act of terrorism, a natural gas explosion, a train derailment, a chemical spill (e.g., from a train or a truck), an explosion, etc.

In some embodiments, the property display generator 64 may only identify neighborhoods affected by a catastrophe and having a concentration of properties insured by an insurance provider that is above a predetermined concentration threshold. For example, the predetermined concentration threshold may be 20 percent of properties. Such neighborhoods may be identified by selecting a set of boundaries which encapsulate the neighborhood and determine the number of properties which are insured by the insurance provider as compared to the number of properties which are not insured by the insurance provider within the set of boundaries. For example, the set of boundaries may be GPS coordinates or alternatively a radius may be specified from a center point within the neighborhood. In other embodiments, all neighborhoods affected by a catastrophe may be identified.

In any event, when a neighborhood is identified, the property display generator 64 may request and/or receive aerial images of the identified neighborhood. For example, the property display generator 64 may receive the aerial images of the identified neighborhood from the satellite device 18 of FIG. 1, from the MAV, or from the UAV(s) 40. The aerial images may be received from the UAV(s) 40 by automatically directing the one or several UAV(s) 40 to fly within the set of boundaries which encapsulate the identified neighborhood. The UAV(s) 40 may also be directed to take several photographs or capture video at different locations within the neighborhood and at several angles. Moreover, the UAV(s) 40, the MAV, or the satellite device 18 may be directed to repetitively capture the same images after a predetermined time interval. For example, the UAV(s) 40, the MAV, or satellite device 18 may be directed to capture the same images every 5 minutes, every 10 minutes, every hour, every 3 hours, etc. Alternatively, after the neighborhood is identified, a remote control client 12 user such as an insurance agent may control the UAV(s) 40 remotely, through a series of user controls on the user interface 30 to cause the UAV(s) 40 to take pictures and/or video at different locations within the neighborhood and at several angles. In other embodiments, the property display generator 64 may request and/or receive aerial images of the exterior of a commercial property, which may be received from the satellite device 18 or the UAV(s) 40. The UAV(s) 40 may be automatically directed to hover over the a set of boundaries which encapsulates the commercial property. Moreover, the UAV(s) 40, the MAV or the satellite device 18 may be directed to repetitively capture the same images after a predetermined time interval (e.g., every second, every minute, every hour, etc.).

After the aerial images are captured and received for the identified neighborhood, the property display generator 64 may filter out aerial images that do not display insured properties, and may group together all of the aerial images which display a single insured property. For example, the customer data and the location data stored in the customer database 66 and the location database 68 of the server 14, respectively, may be used to determine the locations of insured properties as well as their respective property owners. The locations of insured properties may be compared to a received aerial image which contains GPS coordinates of its data points, as described above, to determine whether the received aerial image displays an insured property. For example, if the location of an aerial image matches with one of the locations of the insured properties then the aerial image displays an insured property. If the received aerial image does not display any insured properties the aerial image may be discarded. In some embodiments, none of the aerial images displaying the neighborhood are discarded, and all of the aerial images are utilized. In any event, the property display generator 64 may group the remaining received aerial images with other aerial images which display the same property. In some embodiments, an aerial image may display more than one property. In this instance, the aerial image may be grouped with each of the properties that the image displays.

Each group of aerial images which displays the same property may be combined. The group of aerial images may be combined to generate a 3D image of the property using 3D imaging techniques such as stereoscopy, LIDAR, or photogrammetry. The property display generator 64 may utilize the Cartesian or GPS coordinates received with each aerial image to reconstruct a 3D image of the property using the group of aerial images captured at different locations and angles. Each group of aerial images may be combined to generate a 3D aerial image of each property including each insured property in the neighborhood. The 3D aerial image may be created at a predefined level of detail (e.g., accurate to within ten percent) and/or may be adjustable (e.g., a user or the system may be able to "zoom in" or "zoom out").

The property display generator 64 may then identify the owner of the property displayed in the 3D aerial image or the group of aerial images by accessing the customer database 66 and the location database 68. Additionally, the property display generator 64 may also generate a web page displaying the 3D aerial image or group of aerial images, which may be transmitted to the owner upon receiving login information for a customer account.

Figure 4:
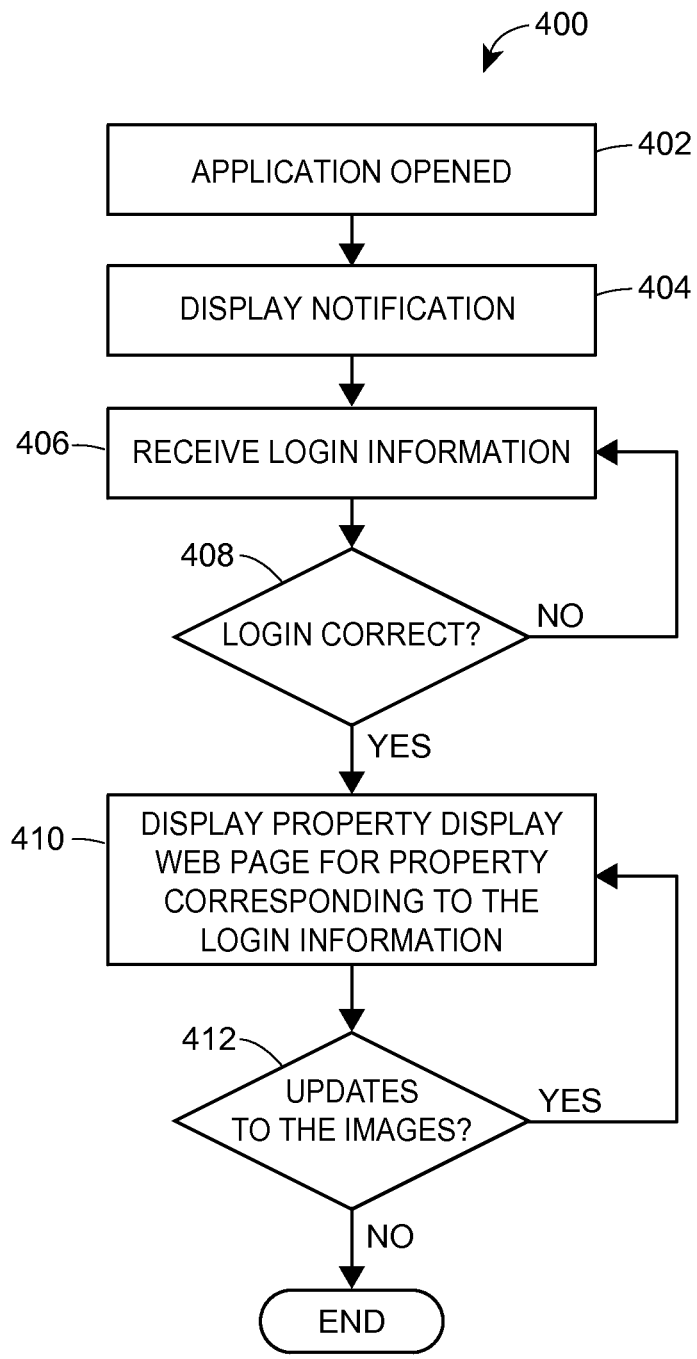
FIG. 4 depicts a flow diagram representing an exemplary client-side method for receiving real-time aerial images of insured properties in a neighborhood in accordance with the presently described embodiments.

FIG. 4 illustrates a flow diagram representing an exemplary client-side method 400 for receiving real-time aerial images of insured properties in a neighborhood. The method 400 may be executed on the web-enabled device 112. For example, at least a portion of the method 400 may be performed by the client application 266 which may be disposed on the web-enabled device 112. In an embodiment, the client application 266 may include computer-executable instructions stored on one or more non-transitory, tangible, computer-readable storage media or devices, and the computer-executable instructions of the client application 266 may be executed to perform the method 400.

At block 402, the user may execute the client application 266 on the web-enabled device 112, causing the client application 266 to display a home screen 114 including a notification alerting the user that a disaster has impacted her neighborhood (block 404). As mentioned above, the notification may also appear on the lock screen of the web-enabled device before the user opens the client application. The user may close the notification by selecting an "OK" button, as mentioned above, and as a result the client application 266 may display a login screen prompting the user to enter a username and password (block 406). The client application 266 then determines if the login information matches with a customer account in a customer database (block 408). If a match does not exist, the client application 266 prompts the user to re-enter the login information (block 406). Otherwise, if there is a match the method proceeds to block 410.

In any event, at block 410 the client application 266 displays a property display web page including real-time (or at least near real-time) aerial images of the property corresponding to the user's customer account or to another user's customer account which the user is authorized to access. In some embodiments, damage severity level indicators may overlay the real-time aerial images such that a user can identify the extent of the damage to her property based on the indicators. The property display web page may also allow the user to toggle between different properties affected by a catastrophe and to toggle between the different aerial images of a property.

At block 412, the client application 266 may determine whether there are any updates to the real-time aerial images. For example, the UAV(s) 40 or the satellite device 18 may be programmed to capture the same aerial images every 15 minutes. After 15 minutes have elapsed, the client application 266 may request the server 266 to transmit a web page including the updated real-time aerial images. If there is an update, the method continues at block 412 and displays the updated real-time aerial image on the web-enabled device 112.

As mentioned above, in an alternative embodiment, the aerial image capturing device may capture aerial images of a car or boat dealership, a department store, a restaurant, a shopping mall, a warehouse, an office building, etc., for surveillance. In such an embodiment, a user, which may be an owner or authorized security company, may receive a notification alerting the user that suspicious activity has occurred on her property. When the owner successfully logs in, the user may receive a property display web page which includes real-time (or at least near real-time) aerial images of the dealership, department store, restaurant, shopping mall, warehouse, office building, etc.

Figure 5:
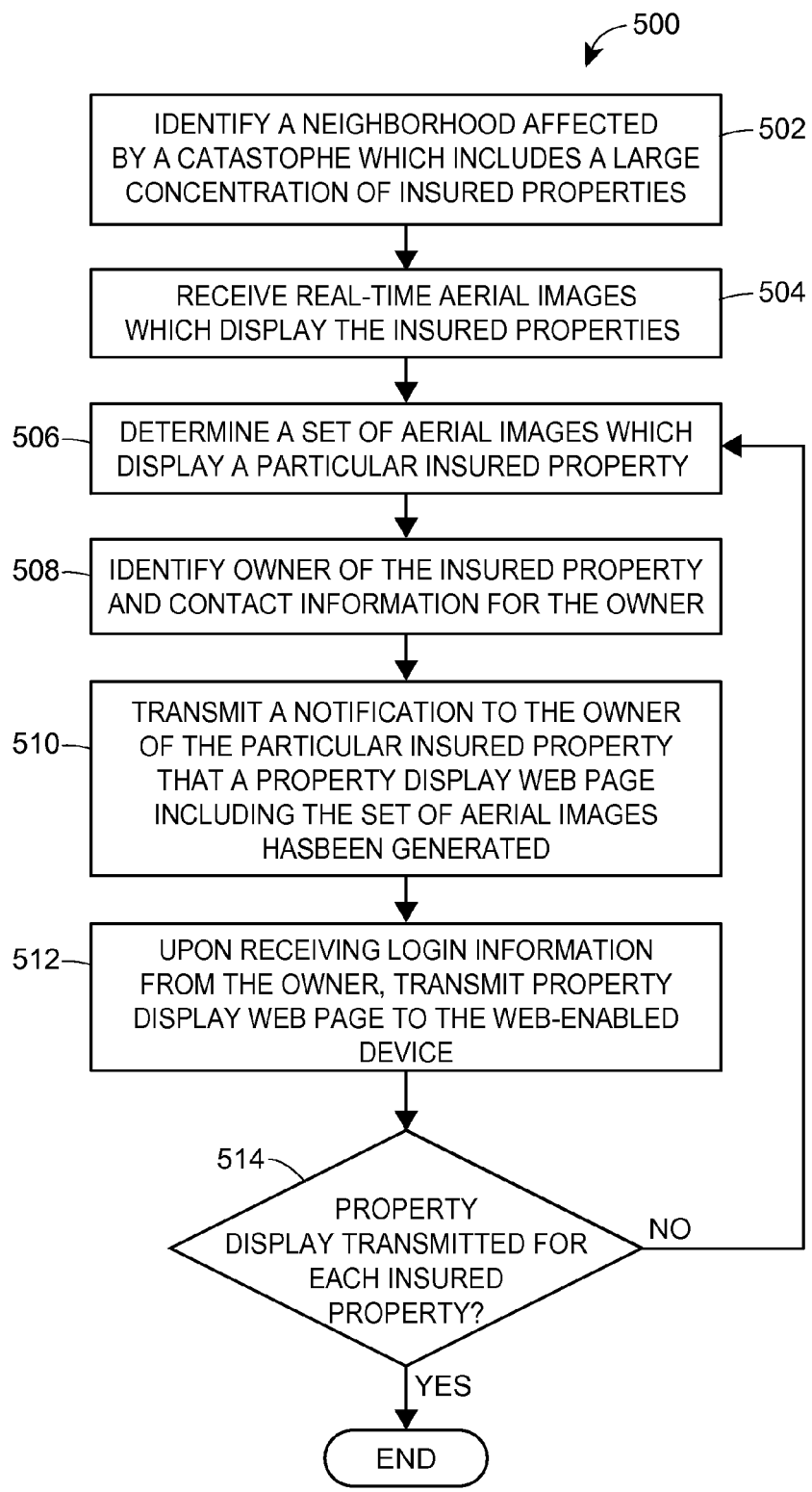
FIG. 5 depicts a flow diagram representing an exemplary server-side method for providing real-time aerial images of insured properties in a neighborhood in accordance with the presently described embodiments.

FIG. 5 illustrates a flow diagram representing an exemplary server-side method 500 for providing real-time (or at least near real-time aerial images of insured properties in a neighborhood. The method 500 may be executed on the server computer 14. For example, at least a portion of the method 500 may be performed by the property display generator 64 of FIG. 1 which as mentioned above, may be disposed on the server computer 14. In an embodiment, the property display generator may include computer-executable instructions stored on one or more non-transitory, tangible, computer-readable storage media or devices, and the computer-executable instructions of the property display generator 64 may be executed to perform the method 500.

At block 502, a neighborhood may be identified which is affected by a catastrophe, theft or other damage and which includes a large concentration of insured properties. For example, neighborhoods having more than 20 percent of properties insured by the same insurance provider may be identified as having a large concentration of insured properties. Neighborhoods may be identified by selecting a set of boundaries which encapsulate the neighborhood and determining the number of properties which are insured by the insurance provider as compared to the number of properties which are not insured by the insurance provider within the set of boundaries. For example, the set of boundaries may be GPS coordinates or alternatively a radius may be specified from a center point within the neighborhood. Neighborhoods affected by a catastrophe may include those neighborhoods impacted by a tornado, hurricane, avalanche, earthquake, flood, tsunami, volcanic eruption, hail storm, wildfire, thunderstorm, nuclear incident, war, act of terrorism, a natural gas explosion, a train derailment, a chemical spill (e.g., from a train or a truck), an explosion, etc.

Then, aerial images which display the insured properties in the neighborhood may be received (block 504). The aerial images may be received from the satellite device 18, the MAV, or the UAV(s) 40 of FIG. 1. In some embodiments, user controls may be disposed on the remote control client 12 which allow a user, such as an insurance agent, to control the UAV(s) 40 remotely and determine when and where to capture aerial images. In other embodiments, the UAV(s) 40 may be preprogrammed to capture aerial images at specified locations. Additionally, in some embodiments, the satellite device 18, the MAV, or the UAV(s) 40 may capture aerial images of the entire neighborhood.

At block 506, the property display generator 64 may determine a set of aerial images which display a particular insured property of the several insured properties in the neighborhood. For example, the location of the particular insured property may be determined. Then each aerial image which displays the same location as the insured property may be grouped into the set of aerial images which display the particular insured property. In some embodiments, when an aerial image displays more than one insured property, the aerial image is grouped into the set of aerial images for each insured property it displays. Moreover, in some embodiments, the set of aerial images may be aggregated to form a 3D display of the particular insured property. For example, the set of aerial images may be aggregated using LIDAR, stereoscopy, or photogrammetry techniques to create the 3D image.

The owner of the particular insured property may be identified by comparing the location of the particular insured property, to the location of each owner's property as determined by the customer database 66 and the location database 68 (block 508). When the owner with a matching property location is identified, the property display generator 64 may also identify contact information for the owner from the customer database 66 or in some other manner as well as contact information for authorized users. For example, the property display generator 64 may identify a phone number or an email address of the property owner.

Then, a notification may be transmitted to the web-enabled device 112 of the owner or an authorized user using the identified contact information (block 510). The notification may alert the owner or authorized user that a catastrophe has occurred in the owner's neighborhood and/or that the owner and/or authorized user can login to their customer accounts to view real-time aerial images of her property. In some embodiments, the notification may be displayed on a client application 266 executed on the web-enabled device 112. Further, in some embodiments the notification may be transmitted to the web-enabled device after verifying the owner's identity by using application data.

At block 512, a property display web page may be transmitted to the web-enabled device, upon receiving login information from the owner. The property display web page may include real-time aerial images of the insured property at different locations, angles and/or zoom levels. In some embodiments, the web page may also include damage severity level indicators overlaying the real-time aerial images such that a user can identify the extent of the damage to her property based on the indicators. The property display web page may also allow the user to toggle between different properties affected by a catastrophe and to toggle between the different aerial images of a property.

At block 514, the property display generator 64 may determine whether or not a property display has been transmitted for all of the insured properties in the neighborhood. If a property display has not been transmitted for every insured property, the method 500 continues at block 506 and a set of aerial images which display another insured property in the neighborhood is determined. Otherwise, if a property display has been transmitted for every insured property, the process ends. Alternatively, in some embodiments the process continues and the property display generator 64 receives new aerial images from the UAV(s) 40, the MAV, or the satellite device 18 at predetermined time intervals (i.e., every 5 minutes). The method then repeats at block 506, and the property display generator 64 transmits an updated web page with the new real-time aerial images at block 510.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One could implement numerous alternate embodiments, using either current technology or technology developed after the filing date of this application.

We claim:

1. A method for displaying near real-time aerial images of insured properties during a catastrophe, the method executed by one or more processors programmed to perform the method, the method comprising:
   prior to capturing aerial images for a neighborhood, identifying, by the one or more processors, that the neighborhood includes one or more insured properties, wherein the neighborhood has been affected by a natural or a man-made disaster, and wherein the neighborhood includes a concentration of the one or more insured properties, each insured by a same insurance provider, which is above a predetermined nonzero concentration level;
   capturing, by an aerial image capturing device having one or more stabilization sensors which control aerial movement of the aerial image capturing device and an image sensor, a plurality of near real-time aerial images which display the neighborhood including the insured properties;
   receiving, at the one or more processors, the plurality of near real-time aerial images from the aerial image capturing device;
   for each of the insured properties in the neighborhood:
      determining, by the one or more processors, one or more near real-time aerial images of the plurality of near real-time aerial images which display at least a portion of an insured property of the insured properties;
      determining, by the one or more processors, a condition of the at least a portion of the insured property based on the respective one or more near real-time aerial images;
      determining, by the one or more processors, a damage severity level based on the condition of the at least a portion of the insured property;
      assigning, by the one or more processors, a damage severity level indicator to the damage severity level;
      identifying, by the one or more processors, an owner of the insured property based on a location of the insured property;
      identifying, by the one or more processors, contact information for the owner of the insured property;
      transmitting, by the one or more processors and over the network, a notification to a web-enabled device of the owner, using the owner contact information, that a property display web page including the one or more near real-time aerial images which display the at least a portion of the insured property has been generated; and
      upon receiving and authenticating user login information including a customer identifier corresponding to the owner of the insured property to confirm that a user is the owner of the insured property, transmitting, by the one or more processors and over a network, the property display web page, to the web-enabled device, the property display web page including the damage severity level indicator displayed overlaying the at least a portion of the insured property;
   and
   wherein in response to identifying that the neighborhood includes a concentration of the one or more insured properties which is above the predetermined nonzero concentration level, the one or more processors automatically direct the aerial image capturing device to capture the plurality of near real-time aerial images which display the neighborhood.

2. The method of claim 1, further comprising for each of the insured properties in the neighborhood:
   determining, by the one or more processors, a predetermined period of time for updating the property display web page; and
   when the predetermined period of time has elapsed:
      receiving, at the one or more processors, one or more new near real-time aerial images which display at least a portion of the insured property;
      updating, by the one or more processors, the property display web page with the new near real-time aerial images; and
      transmitting, by the one or more processors and over the network, the updated property display web page to the web-enabled device.

3. The method of claim 1, wherein the plurality of near real-time aerial images are received via an unmanned aerial vehicle and further comprising:
   directing, by the one or more processors, the unmanned aerial vehicle to one or more locations for capturing the plurality of near real-time aerial images.

4. The method of claim 1, wherein the plurality of near real-time aerial images are received via a satellite.

5. The method of claim 1, further comprising:
   determining, by the one or more processors, a location of each of the received plurality of near real-time aerial images; and filtering, by the one or more processors, the plurality of near real-time aerial images based on the determined locations to determine a subset of the plurality of near real-time aerial images, wherein each near real-time aerial image in the subset displays at least one insured property; and wherein determining one or more near real-time aerial images of the plurality of near real-time aerial images comprises determining one or more near real-time aerial images of the subset of the plurality of near real-time aerial images which display at least a portion of the insured property.

6. The method of claim 1, wherein transmitting the property display web page comprises:

aggregating, by the one or more processors, the one or more near real-time aerial images which display the at least a portion of the insured property to generate a three dimensional display of the insured property; and transmitting, by the one or more processors and over the network, the property display web page including the three dimensional display of the insured property to the web-enabled device.

7. The method of claim 1, wherein a notification includes at least one of: an email, a short message service (SMS) message, an automated voice recording, or an alert.

8. The method of claim 1, wherein determining one or more near real-time aerial images which display at least a portion of an insured property comprises:

determining, by the one or more processors, a location of each of the plurality of near real-time aerial images;

obtaining, by the one or more processors, a location of each of the insured properties in the neighborhood;

comparing, by the one or more processors, the locations of the plurality of near real-time aerial images to the locations of the insured properties; and when there is a match, determining, by the one or more processors, that the near real-time aerial image displays the matched insured property.

9. The method of claim 1, wherein a natural or man-made disaster includes at least one of: a tornado, a hurricane, an avalanche, an earthquake, a flood, a tsunami, a volcanic eruption, a hail storm, a wildfire, a thunderstorm, a nuclear incident, a war, a train derailment, a chemical spill, an explosion, or an act of terrorism.

10. A system for displaying near real-time aerial images of insured properties during a catastrophe, the system comprising:

an aerial image capturing device which captures a plurality of near-real time aerial images that display insured properties, the aerial image capturing device including one or more stabilization sensors which control aerial movement of the aerial image capturing device and an image sensor;

a communication network; and one or more computing devices communicatively coupled to the communication network, and the aerial image capturing device, each of the one or more computing devices having a memory and one or more processors and at least one of the computing devices configured to:

prior to capturing aerial images for a neighborhood, identify that the neighborhood includes one or more insured properties, wherein the neighborhood has been affected by a natural or a man-made disaster, and wherein the neighborhood includes a concentration of the one or more insured properties, each insured by a same insurance provider, which is above a predetermined nonzero concentration level;

receive a plurality of near real-time aerial images from the aerial image capturing device, wherein the plurality of near real-time aerial images display the neighborhood including the insured properties;

for each of the insured properties in the neighborhood:

determine one or more near real-time aerial images of the plurality of near real-time aerial images which display at least a portion of an insured property of the insured properties;

determine a condition of the at least a portion of the insured property based on the respective one or more near real-time aerial images;

determine a damage severity level based on the condition of the at least a portion of the insured property;

assign a damage severity level indicator to the damage severity level;

identify an owner of the insured property based on a location of the insured property;

identify contact information for the owner of the insured property;

transmit, over the communication network, a notification to a web-enabled device of the owner, using the owner contact information, that a property display web page including the one or more near real-time aerial images which display the at least a portion of the insured property has been generated; and upon receiving and authenticating user login information including a customer identifier from the web-enabled device corresponding to the owner of the insured property to confirm that a user is the owner of the insured property, transmit, over the communication network, the property display web page, to the web-enabled device, the property display web page including the damage severity level indicator displayed overlaying the at least a portion of the insured property;

and wherein in response to identifying that the neighborhood includes a concentration of the one or more insured properties which is above the predetermined nonzero concentration level, the one or more computing devices automatically direct the aerial image capturing device to capture the plurality of near real-time aerial images which display the neighborhood.

11. The system of claim 10, wherein for each of the insured properties in the neighborhood the at least one computing device is configured to:

determine a predetermined period of time for updating the property display web page; and when the predetermined period of time has elapsed:

receive one or more new-real time aerial images which display at least a portion of the insured property;

update the property display web page with the new near real-time aerial images; and transmit over the communication network, the updated property display web page to the web-enabled device.

12. The system of claim 10, wherein the plurality of near real-time aerial images are received via an unmanned aerial vehicle.

13. The system of claim 10, wherein the plurality of near real-time aerial images are received via a satellite.

14. The system of claim 10, wherein the at least one computing device is configured to:

determine a location of each of the received plurality of near real-time aerial images; and filter the plurality of near real-time aerial images based on the determined locations to determine a subset of the plurality of near real-time aerial images, wherein each near real-time aerial image in the subset displays at least one insured property; and wherein to determine one or more near real-time aerial images of the plurality of near real-time aerial images, the at least one computing device is configured to determine one or more near real-time aerial images of the subset of the plurality of near real-time aerial images which display at least a portion of the insured property.

15. The system of claim 10, wherein to transmit a property display web page the at least one computing device is configured to:

aggregate the one or more near real-time aerial images which display the at least a portion of the insured property to generate a three dimensional display of the insured property; and transmit, over the communication network, the property display web page including the three dimensional display of the insured property to the web-enabled device.

16. The system of claim 10, wherein a notification includes at least one of: an email, a short message service (SMS) message, an automated voice recording, or an alert.

17. The system of claim 10, wherein to determine one or more near real-time aerial images which display at least a portion of an insured property, the at least one computing device is configured to:

determine a location of each of the plurality of near real-time aerial images;

obtain a location of each of the insured properties in the neighborhood;

compare the locations of the plurality of near real-time aerial images to the locations of the insured properties; and when there is a match, determine that the near real-time aerial image displays the matched insured property.

18. The system of claim 10, wherein a natural or man-made disaster includes at least one of: a tornado, a hurricane, an avalanche, an earthquake, a flood, a tsunami, a volcanic eruption, a hail storm, a wildfire, a thunderstorm, a nuclear incident, a war, a train derailment, a chemical spill, an explosion, or an act of terrorism.

\* \* \* \* \*